United States Patent
Bedingfield, Sr.

(10) Patent No.: US 8,715,082 B2
(45) Date of Patent: May 6, 2014

(54) SYSTEMS, METHODS AND COMPUTER PRODUCTS FOR IPTV NETWORK GAME CONTROL

(75) Inventor: James Carlton Bedingfield, Sr., Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1109 days.

(21) Appl. No.: 11/788,089

(22) Filed: Apr. 19, 2007

(65) Prior Publication Data
US 2008/0261686 A1   Oct. 23, 2008

(51) Int. Cl.
*A63F 13/12* (2006.01)
(52) U.S. Cl.
USPC .............. 463/42; 463/40; 463/36; 463/39
(58) Field of Classification Search
USPC .................. 463/36, 39, 40, 42, 43
See application file for complete search history.

(56) References Cited

U.S. PATENT DOCUMENTS

| | | | | |
|---|---|---|---|---|
| 6,007,426 A | * | 12/1999 | Kelly et al. | 463/16 |
| 6,264,559 B1 | * | 7/2001 | Lawrence et al. | 463/40 |
| 6,966,837 B1 | * | 11/2005 | Best | 463/33 |
| 7,613,782 B2 | * | 11/2009 | Nakajima et al. | 709/206 |
| 2002/0126846 A1 | * | 9/2002 | Multerer et al. | 380/251 |
| 2005/0202875 A1 | * | 9/2005 | Murphy et al. | 463/42 |
| 2006/0121991 A1 | * | 6/2006 | Borinik et al. | 463/43 |
| 2006/0159100 A1 | * | 7/2006 | Droms et al. | 370/395.2 |
| 2006/0287028 A1 | * | 12/2006 | MacIver et al. | 463/9 |
| 2007/0099694 A1 | * | 5/2007 | McCarthy et al. | 463/24 |
| 2008/0195461 A1 | * | 8/2008 | Li et al. | 705/10 |

FOREIGN PATENT DOCUMENTS

KR   2004028083 A   *   4/2004

OTHER PUBLICATIONS

Zune Review—CNET, written by James Kim and published on Nov. 14, 2006, retrieved from http://reviews.cnet.com/mp3-players/zune-30gb-black/4505-6490_7-32068976.html, pp. 1-11.*

How to Change Your Zune's Device Name, contributed by Rob Rogers on Nov. 21, 2006, retrieved from http://www.tech-recipes.com/rx/1872/zune_how_to_change_device_name/, p. 1.*

* cited by examiner

*Primary Examiner* — Arthur O Hall
*Assistant Examiner* — Jasson Yoo
(74) *Attorney, Agent, or Firm* — Cantor Colburn LLP (57) ABSTRACT

Systems and methods for IPTV network game control. Exemplary embodiments include a game system, including a communications device, a game controller functionally coupled to the communications device and a process for establishing communication between the communications device and the game controller for manipulating game content, the process including instructions to receive game content from a network, the content being displayed on the communications device and interactively controlled by the game controller via communication with the communications device.

1 Claim, 5 Drawing Sheets

SYSTEMS, METHODS AND COMPUTER PRODUCTS FOR IPTV NETWORK GAME CONTROL

BACKGROUND

The present invention relates generally to Internet Protocol Television (IPTV), and more particularly, to systems and methods for IPTV network game control.

Families and friends often play card games, board games, and other sorts of games for relaxation, competition, and fun. Many games require some sort of equipment (e.g., a board, game pieces, dice, a timer, etc.), while others require a body of knowledge often in the form of a question and answer (e.g., Trivial Pursuit®, etc.) Some games are based on specialized equipment (e.g., CatchPhrase®). Many of these devices are limited in function (e.g., the typical sand-based timer) or scope (e.g., pre-printed questions that are "consumed" or go out of date).

Contemporary cable and satellite television systems generally utilize a set-top box on the customer's premises. Sometimes limited set-top box functionality is built into the television, but the set-top box and the television are generally separate devices. The set-top box performs authentication, authorization, and accounting functions (such as placing a phone call to enable the set-top box to present a pay-per-view program to the attached television). However, a primary function of the set-top box (at least from the customer's viewpoint) is channel selection, including presenting the list of channels available to the customer. This list is often referred to as the electronic programming guide. IPTV utilizes set-top boxes to decode programming delivered over the IP network. This additional power can also be leveraged to provide more flexible services to customers. IPTV set top boxes are being designed to allow functions such as access to Internet content (weather, maps, video, music), and access to local video content (e.g., viewing the security camera at the apartment front gate or pool area).

Traditional PC-based and console gaming is often focused on high-realism, first-person, quick response games that require special game controllers, high-speed graphics cards, high-resolution displays, and fast processors. However, there lacks gaming functionality available via IPTV.

The above-described limitations could be addressed with a network-based collection of multi-player games that could be played over an IPTV connection, but for the lack of a good playing device for each player. What is needed in this context is a new, flexible type of game controller that is well-suited to these applications.

BRIEF SUMMARY

Exemplary embodiments include a game system, including a communications device, a game controller functionally coupled to the communications device and a process for establishing communication between the communications device and the game controller for manipulating game content, the process including instructions to receive game content from a network, the content being displayed on the communications device and interactively controlled by the game controller via communication with the communications device.

Additional exemplary embodiments include an Internet Protocol television game controller apparatus, including a main body, control buttons disposed on the main body, a processor disposed within the main body and coupled to the control buttons, a memory disposed within the main body and coupled to the processor and a game process having instructions to manipulate game content via an interaction of the Internet Protocol game controller with a communications device, the game content being interactively controlled by input generated by the control buttons.

Further exemplary embodiments include an Internet Protocol television gaming method, including creating a gaming account profile including gaming content preferences associated with a communications device, establishing a device identifier for the communication device coupled to a set top box, authenticating the communication device and providing gaming content based on the gaming content preferences to the communication device for interaction via a game controller associated with the communication device.

Additional exemplary embodiments include a computer-readable medium having computer-executable instructions for performing a method, including creating a gaming account profile including gaming content preferences associated with a communication device, establishing a device identifier for the communication device coupled to a set top box, authenticating the communication device and providing gaming content based on the gaming content preferences to the communication device for interaction via a game controller associated with the communication device.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

In exemplary embodiments, a network-based collection of multi-player games that are playable over an IPTV connection via an IPTV game controller is provided. IPTV enables complex and rapid interactions between a user, a set-top-box, and network-based services such as IPTV game applications enabled via an IPTV game controller. In exemplary implementations, a hand-held game controller and the IPTV game capability enables the development of network-based games suitable for playing in a single location by one or more players. In other exemplary embodiments, it is further contemplated that multiple players in multiple locations can also engage in IPTV game play. The sturdy, easily-changeable, rechargeable, hand-held game controller with a display and input mechanism (e.g., pushbuttons, touch screen, etc.) communicates wirelessly with a set-top box that provides local functions (e.g., stop the timer, show the next word, deal the cards, etc.) and also communicates through the network to provide the overall service logic of the particular game being played. The set-top box and wireless interface support multiple IPTV game controllers and other devices as well as multiple users.

Figure 1:
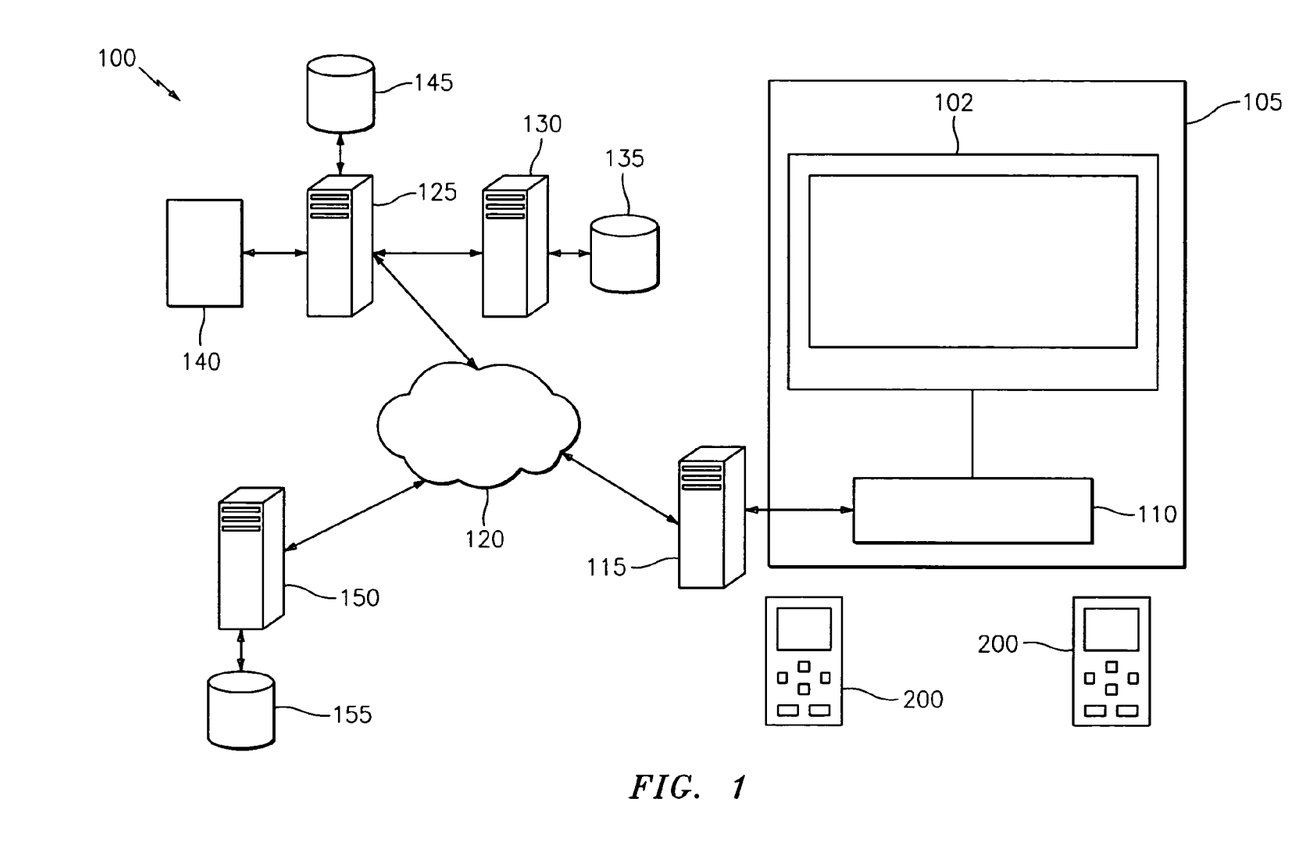
FIG. 1 illustrates a block diagram of an exemplary IPTV network game controller system.

FIG. 1 illustrates a block diagram of an exemplary IPTV network game controller system 100. IPTV network game controller system 100 provides an infrastructure through which one or more users can access game content through a communications device 105, such as an IPTV-enabled television 102 and set top box 110 configuration. It is understood that in other exemplary embodiments and implementations, communications device 105 can be a variety of other communications devices such as general purpose or laptop computers, wireless devices such as cellular telephones, portable computing device, digital music player (e.g., MP3 players), and the like. In addition, a wireline PSTN telephone, SIP telephone, dual-mode mobile telephone, personal digital assistant (PDA), or other type of communications device may be included in the system of FIG. 1.

The IPTV network game controller system 100 can therefore provide game access for multiple game controllers 200 as requested by the user(s). The IPTV network game controller system 100 can further manage multiple accounts as established by particular users. These accounts may then be used to provide access to the game services as described further herein.

According to exemplary embodiments, the IPTV network game controller system 100 includes communications device 105 as discussed above, which can be a IPTV enabled television 102 communicatively coupled to a set top box 110, which is in turn communicatively coupled to server 115 for accessing a network 120, such as the Internet. As indicated above, the network 120 may include circuit-switched and/or packet-switched technologies and devices, such as routers, switches, hubs, gateways (e.g., residential gateways, including a DSL modem, etc.), IMS-based network, etc., for facilitating communications between the communications device 105 and authentication server 130. The network 120 may include wireline and/or wireless components utilizing, e.g., 802.11 standards for providing over-the-air transmissions of communications. Network 120 can be an IP-based network for communication between a customer service center and clients, as discussed further below, using communication devices 105 via a broadband connection. According to exemplary embodiments, network 120 transmits programming content from content services provider systems to customers via devices, such as communications device 105, through a broadband connection. In exemplary embodiments, network 120 can be a managed IP network administered by a service provider, which can control bandwidth and quality of service for the communications discussed herein. Network 120 may be implemented in a wireless fashion, e.g., using wireless protocols and technologies, such as WiFi, WiMax, etc. Network 120 can also be a packet-switched network as a local area network, wide area network, metropolitan area network, Internet network, or other similar type of network environment. Network 120 may be a cellular communications network, a fixed wireless network, a wireless local area network (LAN), a wireless wide area network (WAN) a personal area network (PAN), a virtual private network (VPN), intranet or other suitable network system and includes equipment for receiving and transmitting signals such as a cell tower and mobile switching center. In another exemplary embodiment, network 120 can be a circuit-switched network such as a standard public switched telephone network (PSTN).

As further shown in FIG. 1, a host server 125 is in communication with the authentication server 130 and communications device 105 via the networks 120. The host server 125 may be implemented using a high-speed processing device (e.g., a computer system, etc.) that is capable of handling high volume activities conducted via the communications device 105 and other network entities (e.g., authentication server 130, etc.). The host server 125 may be implemented by a network service provider, a content service provider, or other enterprise. Similarly, the authentication server 130 may be implemented using a high-speed processing device (e.g., a computer system, etc.) that is capable of handling high volume activities conducted via the communications device 105, and other network entities (e.g., server 115, etc.) via the network 120. According to exemplary embodiments, the authentication server 130 receives requests from the communications device 105 either to establish a gaming account or to access network services (e.g., to access game content). Authentication server 130 may implement authentication software for restricting or controlling access to network services provided by the host server 125. Authentication server 130 may be in communication with a customer identity system (CIS) database 135, which stores user credentials (e.g., user names and passwords) established via a gaming application 140. In another exemplary embodiment, user credentials can be stored on the communications device 105. In an IMS environment, user credentials may also be stored in an HSS.

As discussed above, the communications device 105 may be an Internet Protocol-enabled television (IPTV). In exemplary embodiments, the user can establish an account using devices associated with the user. For example, the communications device 105 can enable the establishment of an account that is managed by the provider enterprise of host server 125. As such, the communications device 105 may receive Internet services from the provider enterprise of host server 125. As such, an account record may be generated for the user of communications device 105 that identifies the user and the account for which the services are provided. Account information and records may be stored in a storage device accessible by the host server 125, such as a storage device 145.

In exemplary embodiments, communications device 105 is owned/operated by one or more individuals that share some relationship (e.g., members of a household). The host server 125 may implement one or more applications for establishing and utilizing a gaming service account via the gaming application 140, according to exemplary embodiments. The gaming service account can be stored in the storage device 145. A gaming service account may be created for multiple game controllers 200 via communications device 105. Therefore, a user can configure or otherwise establish preferences in setting up the gaming account. In an exemplary implementation, game services can include customized game content services provided by gaming application 140. The customized gaming services enable users of the communications device 105 to customize content received on the communications device 105. For example, a user can change the fundamental operation of a game, such as uploading a picture of the user's own face for the game character, or adding some new, high-tech weapon, or re-defining the rules in Monopoly®, etc. According to other exemplary embodiments, types of gaming, gaming content provider preferences, parental controls, and interactive communications including electronic purchasing, are among the many services provided via the customized gaming services.

In another exemplary embodiment, the IPTV network game controller system 100 includes a content server 150 in communication with host server 125, authentication server 130, and the communications device 105 over the network 120. The content server 150 may be coupled to a content database 155. Content server 150 may be implemented at a video head end office (VHO), regional video services office (VSO) or other source of content that distributes gaming or other programming, on a local, national, or international basis. While only one content server 150 is shown for ease of illustration, it is understood that content server 150 may be one of many content servers 150 in communication with the IPTV network game controller system 100. It is appreciated that in other exemplary embodiments, the content servers 150 may provide a variety of content over an IP-based network. The content may include premium channels, broadcast programming, and Internet-based matter. The content provided by content servers may include, e.g., news, sports, weather, business, shopping, traffic, stocks, etc., and may provide a range of content types, such as health and fitness, documentaries, comedy, science fiction, action/adventure, horror, romance, drama, etc., over IP-based network. As such, a user of the IPTV network game controller system 100 may designate preferred content providers and preferred content, as well as preferred localized content with respect to, e.g., weather, traffic, etc. on communications device 105.

The host server 125 can execute the gaming application 140 for facilitating the customized gaming services described herein. Users of the communications device 105, who have established a gaming service account, may establish personalized electronic gaming guides for customizing the content provided by content sources (e.g., content server 150). In addition, a separate identity for other IPTV-enabled communications devices associated with the account may be established for further personalizing the content received by users in the account.

The gaming application 140 may provide a user interface via a display screen of the communications device 105 such that a user of the device 105 may be prompted to establish a personalized electronic gaming guide, utilizing, according to exemplary embodiments, the game controller 200 (as discussed further in the description below). The options provided by the user interface may be selected via input features and functions (e.g., up/down, left/right arrow keys, 'select' key, etc.) provided on the communications device 105, the display screen of the communications device 105, on a remote control device associated with the communications device 105, and/or the game controller 200.

In addition, the set top box 110 associated with the communications device 105 may be configured to send a unique device identifier (e.g., GUID, MAC address, serial number, etc.) to the host server 125, which in turn, initiates the gaming application 140. In this embodiment, the gaming application 140 presents the user interface options on the communications device 105 and associates results of the user's selections with the device identifier. Further, the device identifier may then be used, along with the user's network address, or PPPoE address, provided in the account to designate a transmission address for distributing the customized content.

Once a user initially registers the device 105 with the host server 125, the user may be prompted via the communications device 105 to rename the communications device 105 and in exemplary embodiments, the individual game controllers 200. Since the establishment of the service provider account and the gaming account can occur at different times, it is appreciated that the user can register the communications device 105 and the controllers 200 either when the user establishes the service provider account or the gaming account. The gaming application 140 stores the new user credentials (i.e., the device identifier and PPPoE information) in the CIS 135. Future requests from users to access content via the gaming application 140 are authenticated by authentication server 130 as the device has been configured for the gaming services, as well as the customized gaming services. If a user chooses not to 'log in' to the account prior to accessing content on the communications device 105, the user is presented with content as typically implemented in the art.

As indicated above, a registered user may establish a personalized electronic gaming guide via the customized gaming service. In addition, a user with maximum defined access control privileges (e.g., head of household, parent, etc.) as set forth in the user's gaming service account configured via the gaming application 140, may manage other users established in the account. For example, a user can set up a filter thereby controlling which members of the account can access which games in accordance with Entertainment Software Rating Board (ESRB) ratings.

In an exemplary embodiment, the host server 125 may execute one or more computer programs to facilitate the gaming application 140. The processing is described in more detail below and may include having all of the gaming application 140 residing on the host server 125 or sharing the processing of the gaming application 140 between the host server 125, and optionally, the content server 150, the set top box 110 and/or game controllers 200.

Figure 2:
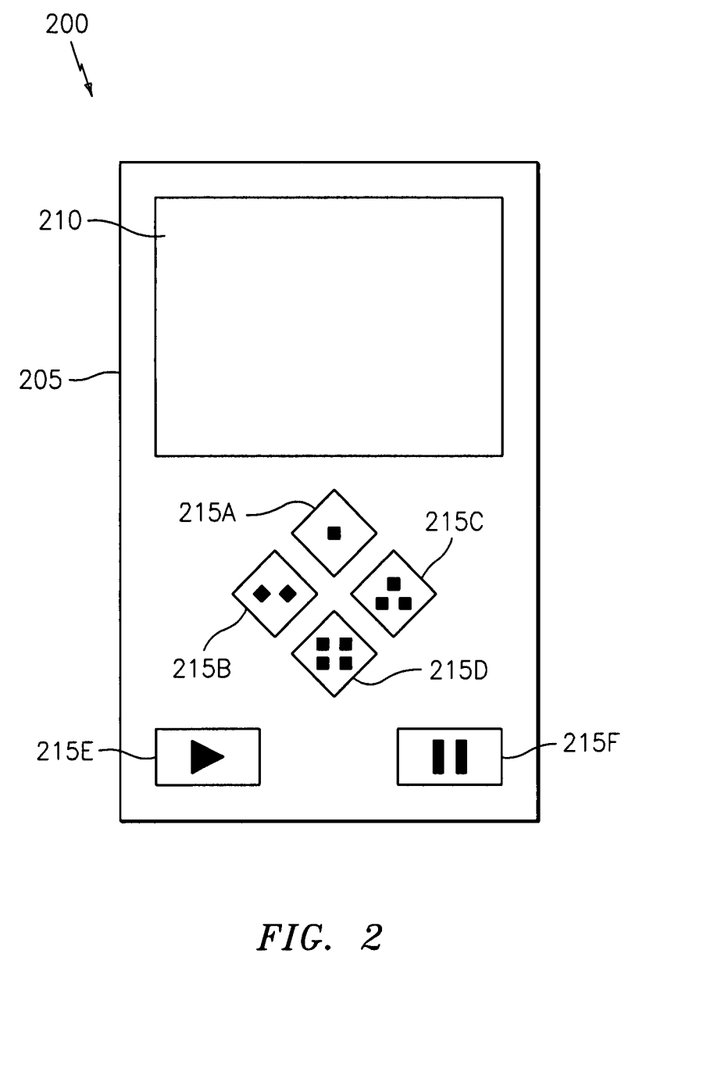
FIG. 2 illustrates an exemplary IPTV network game controller.

FIG. 2 illustrates an exemplary embodiment of the IPTV network game controller 200. In an exemplary implementation, the IPTV game controller 200 is a hand-held device connected to a compatible set-top box, such as set top box 110. The connection between the game controller 200 and the set top box 110 can be a wireless connection (using infra-red or visible light, or radio frequency such as 802.11 or Bluetooth). In another implementation, a wired connection (e.g., USB, proprietary interface, etc.) is also contemplated. In still other implementations, a wired connection or a wireless connection is contemplated between multiple game controllers 200. As discussed further below, the IPTV network game controller 200 can have a number of control buttons 215A, 215B, 215C, 215D, 215E, 215F. According to exemplary embodiments, pressing a button can have the effect of signaling the set top box 110, or another game controller 200 or a combination thereof. The interpretation of a button press is in the context of the current game and/or game application.

According to exemplary embodiments, the game controller 200 includes a main housing 205 having a display 210 that can be used in conjunction with a display on communications device 105 as discussed further in the description and examples below. In exemplary implementations, the display 210 can simply display gaming information and other content. In other exemplary implementations, the display 210 can be interactive (e.g., as a touch screen, etc.) The control buttons 215A, 215B, 215C, 215D, 215E, 215F, associated with the game controller 200, can be implemented in order to provide gaming input from a user to the set top box 110 and/or to navigate on the display of the communications device 105 and/or the display 210. The control buttons 215A, 215B, 215C, 215D, 215E, 215F can also be used to manipulate gaming output from set top box 110 received either locally, such as from another controller or from the network 120. It is appreciated that there are a variety of other uses and implementations for control buttons 215A, 215B, 215C, 215D, 215E, 215F. Those skilled in the art appreciate that multiple power supply capabilities are contemplated including, but not limited to, power physical contact rechargeable battery, inductive rechargeable battery, separate charging pad, charging pad incorporated into the set top box 110, etc.

In an exemplary implementation, it is appreciated that the set top box 110 can support multiple IPTV network game controllers 200, and each of the IPTV network game controllers 200 can be visibly numbered so that players can identify which device that the player is holding. In further exemplary implementations, the IPTV network game controllers 200 can also be permanently supplied with a unique electronic code so that the set top box 110 can properly identify which IPTV network game controller 200 is transmitting a signal, even across networks.

Figure 3:
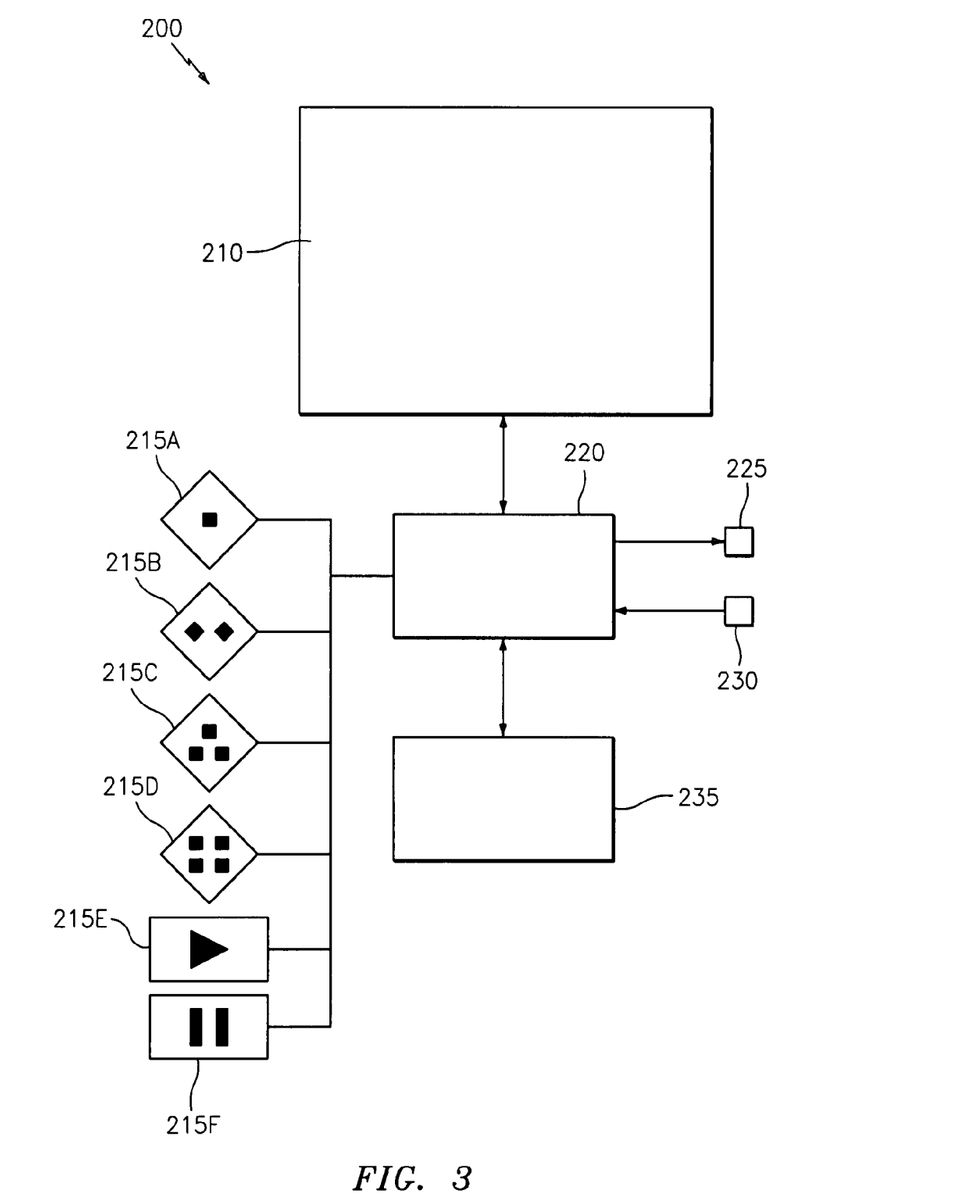
FIG. 3 illustrates a system block diagram of an exemplary IPTV game controller.

FIG. 3 illustrates a system block diagram of the exemplary IPTV game controller 200. As described above, game controller 200 includes display 210 that is functionally coupled to a processor 220. It is appreciated that game controls 215A, 215B, 215C, 215D, 215E, 215F are also functionally coupled to processor 220. IPTV game controller 200 further includes a memory 235 coupled to the processor 220. According to exemplary embodiments, the processor 220 receives instructions and data from the memory 235, which can be read-only memory ROM and/or RAM, DRAM, etc. It is appreciated that other non-volatile memory, including by way of example semiconductor memory devices, such as EPROM, EEPROM, and flash memory devices; magnetic disks such as internal hard disks and removable disks; magneto-optical disks; and CD-ROM disks etc can be implemented for memory 235. IPTV game controller 200 may further include an output transducer 225 (e.g., a light emitting diode (LED), etc.) for sending output data to set top box 110 and optionally to another game controller 200. IPTV game controller 200 further includes an input transducer 230 (e.g., a photovoltaic cell, etc.) for receiving input game data from set top box 110 or optionally from another IPTV game controller 200. The input and output transducers 225, 230 can implement a various number of communications protocols, including, but not limited to: connection infra-red; visible light; radio frequency such as 802.11; Bluetooth; bi-directional (e.g., screen flashing, IR from the set top box), etc.

It is therefore appreciated that in one exemplary embodiment, the IPTV game controller 200 can implement one-directional signaling, generally between the IPTV game controller 200 and the set top box 110. In another exemplary embodiment, the IPTV game controller 200 can implement two directional signaling between multiple controllers 200 and the set top box 110, thereby enabling the set top box 110 to send data and information to individual controllers 200 for greater game flexibility. In one exemplary implementation, the two-way signaling may be basic (e.g., using the TV screen to flash codes to the game controllers, etc.), or, in another exemplary implementation, may be a full, bidirectional 802.11 wireless connection, etc., as discussed above. As such, more advanced games can implement the display 210 for games in which individual players receive secret information as part of the game. For example, the display 210 could be used for a poker game, where each player receives individual "cards" secretly sent to their controller 200, while common cards and the score (e.g., chips) are displayed on the communications device 105 display. In another example, the controller 200 can implement a larger screen, in higher-resolution color, with a touch-screen overlay, to provide support for more complex games that implement secret information, such as Battleship®.

Since IPTV enables complex and rapid interactions between the user, set-top-box 110, and network-based services, the IPTV game controller 200 enables the development of network-based games suitable for playing in a single location by multiple players, as discussed. In other exemplary embodiments, game applications can be combined with videoconference capability to allow players in different locations to play the same game together. As such, the IPTV architecture can readily support on-line games, even including video chat as part of the game. The game controllers 200 can enable such games. Therefore, it is appreciated that the system 100 can be implemented in other settings other than a parlor setting, in which the players are gathered in the same room.

Figure 4:
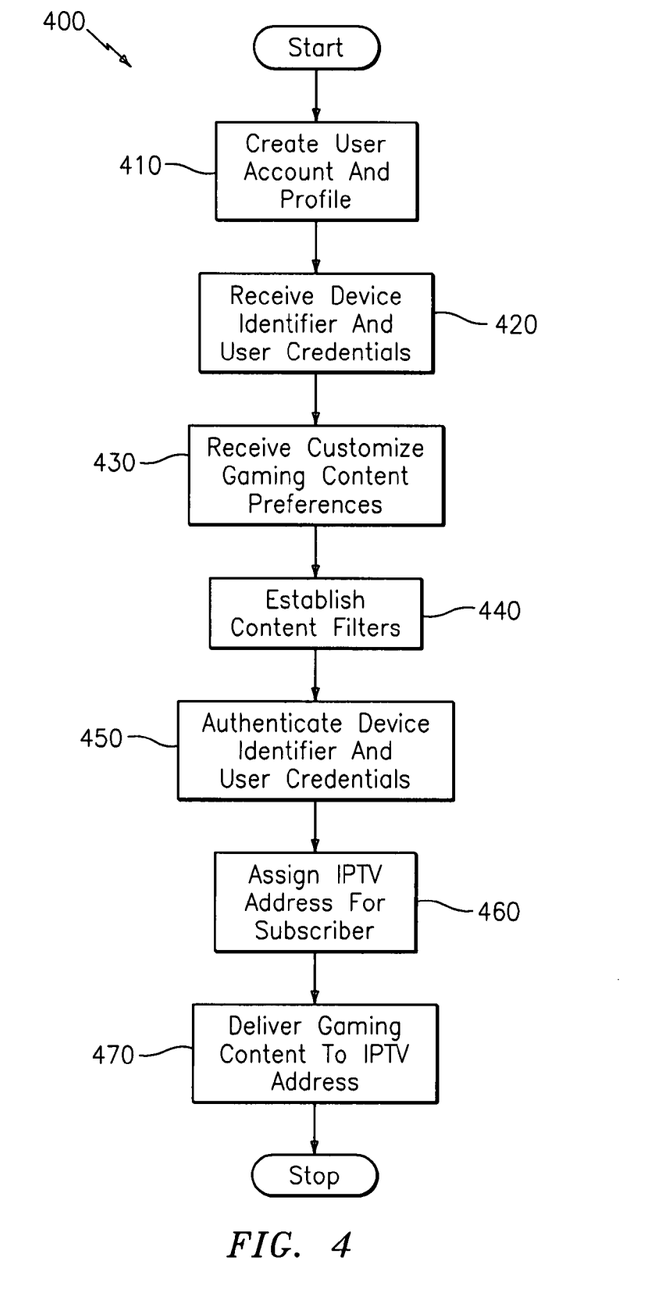
FIG. 4 illustrates a flow diagram describing a process for implementing gaming services in accordance with exemplary embodiments.

In exemplary embodiments, the IPTV network game controller system 100 is used to implement gaming services as discussed above. In order to establish a gaming account, communications device 105 and game controller 200 can be used to set up account parameters and any customized content. Turning now to FIG. 4, a process for implementing gaming services via the IPTV network game controller system 100 is described. In general, it is appreciated that communications device 105 has been configured to receive network services as described above. In addition, the game controllers 200 and communications device 105 are functionally coupled to one another and co-located on common premises. As discussed above, it is further contemplated that, in general, after establishing an account, other set top boxes and IPTV game controllers at remote locations can also be associated with the controllers 200 and set top box 110 discussed above.

In an exemplary implementation, upon requesting subscription to the gaming services, the communications device 105 and optionally the game controllers can receive a prompt from either the host server 125 or the content server 150, to receive the gaming services, which can be a text message received in the communications device 105 and/or game controllers 200. A unique identifier of the communications device 105 may be used as a device identifier by the gaming application 140. In addition, the user may be asked to enter user credentials (e.g., user name and password associated with the account, or other account information) in order to authenticate the user with the host server 125. Likewise, at the time of configuration, a user of communications device 105 may be prompted via set top box 110 and the display on communications device 105 to enter user credentials for authentication. The device identifier used to identify the communications device 105 may be a unique identifier (e.g., globally unique identifier (GUID), a MAC address, serial number, etc.) assigned to the set top box 110 during manufacture. Therefore, an authentication occurs for the communications device 105 by transmitting the device identifier (e.g., SIM number or GUID) and user credentials to the authentication server 130. In general, this transmission may occur via set top box 110 and servers 115, 125 to authentication server 130.

Therefore, at step 410 the user creates the user account and profile, as discussed above, which can occur after being prompted as described above. At this step, the user can enter or modify all necessary demographic information, preferences, filters, gaming interests, etc. It is appreciated that the aforementioned information can be entered or modified via the game controller 200, the set top box 110, or a combination thereof. It is further appreciated that the user can enter the aforementioned information remotely, such as via a web interface on a computer, etc. The web interface could be used to modify the user configuration as stored on the network, as stored in the set top box 110, or as stored in the game controller 200. For example, the appearance or background of the game controller 200 can be changed via download.

At step 420, the host server 125 and content server 150 can receive the communication device 105 identifier and user credentials. In addition, at step 430, the host server 125 and content server 150 can receive customized gaming content preferences as established by the user at step 410 during the account creation. At step 440, content filters based on the preferences established by the user can be established such that only the content set by the preferences and filters are sent to the communications device 105. Host server 125 and content server 150 can then record the preferences and the filters, in particular, via gaming application 140 in order to provide or reject particular content based on the preferences and filters. It is therefore appreciated that upon establishing an account, a master user, such as a parent, can further be identified. This master user can have sole access to modify any preferences and filter content. At step 450, the device identifier and user credentials are authenticated via the authentication server 130. At step 460, a unique IPTV address can be assigned to communications device 105, with optional sub-addresses to the gaming controllers 200. Once the account and addresses are established and the device and credentials authenticated, the user can receive gaming content that according to exemplary embodiments, matches preferences set forth in the gaming service account associated with the communications device 105 and/or the game controller 200 at step 470. It is appreciated that gaming content can be delivered and subsequently selected by the user in a variety of ways, including, but not limited to: pull down menus, check selection boxes, menu listings, etc.

In exemplary embodiments, the game controller(s) 200 interact with the set top box 110. In general, it is appreciated that any given game can reside on the game controller 200, the set top box 110 or a combination thereof. In other exemplary implementations, the games may entirely reside on host server 125 through gaming application 140 or optionally on content server 150. The IPTV game controllers 200 interact with set top box 110 and the display of communications device 105 to support common game functions such as rolling dice (i.e., generating a random number), timing (i.e., to replace the sand-filled hourglass included with many parlor games), and score-keeping (i.e., to replace the pad of paper and tiny pencil included in many games.) The aforementioned games are examples of simplified games. It is appreciated that in other embodiments, more complex games such as role-playing games, first person shooters, real time strategy games, etc. are contemplated.

Figure 5:
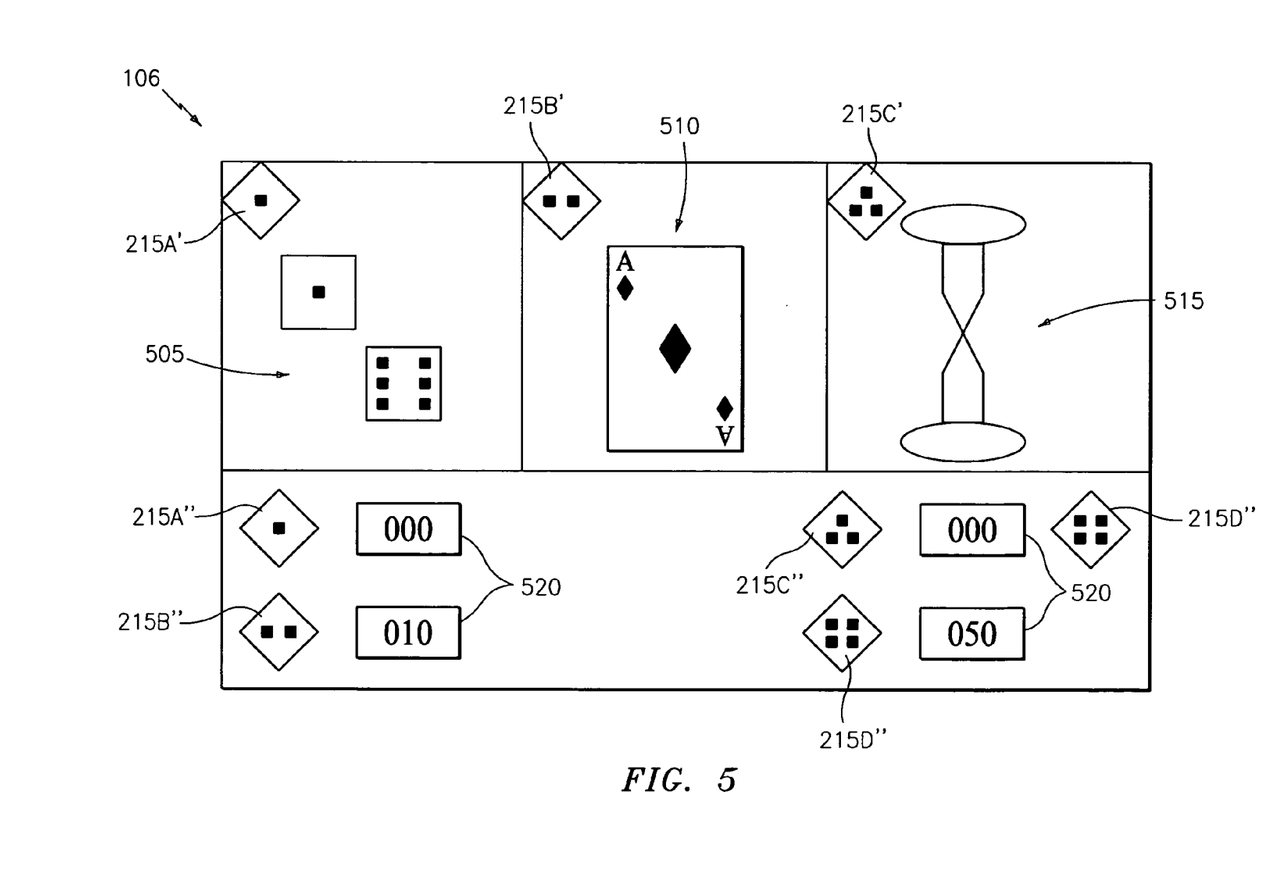
FIG. 5 illustrates an example of a communications device screen 106 displaying modes of manual game-play.

In aforementioned game mode, a game board and pieces may be used, and a single game controller 200 is passed from player to player to "roll the dice" and/or start the timer. If the scoring function is being used, a game controller 200 can be used for each team, and pressing one or more of the control buttons 215A, 215B, 215C, 215D, 215E, 215F increments the visual display of the score. In this way, the game controllers can be used as a manual scoring device. FIG. 5 illustrates an example of a communications device screen 106 displaying modes of manual game-play. The screen 106 includes graphical representations of several gaming pieces, including, but not limited to dice 505, cards 510 and a timer 515, etc. It is appreciated that in other exemplary implementations, other gaming pieces can be displayed. A corresponding representation of control buttons 215A', 215B', 215C' can be displayed along with the game pieces. The representations of the control buttons 215A', 215B', 215C' indicate to the user which corresponding control button to depress on the game controller 200 in order to select the particular game piece. Furthermore, representation of control button 215D' can allow a user to select a scoring section having additional representations of control buttons 215A", 215B", 215C", 215D". The additional representations of control buttons 215A", 215B", 215C", 215D" can be displayed along with score boxes 520 to indicate to the user how to select a particular score to manually enter a score for a particular team, represented by the representations of the control buttons 215A", 215B", 215C", 215D". It is understood that the aforementioned game controls and pieces are only examples of uses for the game controllers 200 in this game mode.

In another exemplary embodiment, in another game mode, the game controller 200 and set top box 110 combination can be used to play an interactive IPTV game. For example, a word game or Trivial Pursuits®-type game presents a new word or question on the screen 106 when the appropriate control button 215A, 215B, 215C, 215D, 215E, 215F is pressed. In one implementation, the presentation of a word or question could also automatically start a timer, and also keep score based on the game controller 200 response received. In another example, in one controller 200, team A can pass a word to team B on another controller 200. The word would appear on the controller screen 210. A player on Team B who holds the controller that received the word can then give hints to another team member to guess the word. When guessed, one of the control buttons 215A, 215B, 215C, 215D, 215E, 215F can be pressed to stop the timer, increment the score for Team B then pass a word to Team A's controller to start a similar sequence for Team A. To assure accuracy, the set top box 110 can also receive all transmitted data so that a visual timer on the screen of the communications device 105 can be displayed as well as a score and other pertinent information to the game.

Other examples of games such as poker and Battleship® are discussed above. In still other examples, games that involve multiple-sided dice, such as 4, 6, 12, 20, etc, -sided die can be implemented using a random number generator. Such multiple-sided die are common in role-playing games such as Dungeons and Dragons®. In still other examples, combinations of the control buttons 215A, 215B, 215C, 215D, 215E, 215F can be implemented to record scoring based on user responses to multiple-choice questions, speed based questions, etc. The set top box 110 can then identify which controller 200 responded first. The control buttons 215A, 215B, 215C, 215D, 215E, 215F can further be used to move a cursor, playing piece etc. around the screen as up/down/left/right buttons. The control buttons 215A, 215B, 215C, 215D, 215E, 215F can further be used to enter personal identification number (PIN) information. Still other games can include charades, traditional board games, card games, word games, etc.

It is appreciated that several rules and certifications can be implemented in the overall system 100 or on a games-based basis. For example, while most parlor games are friendly and played in a trusting environment, steps can be taken to assure players of the true randomness of the dice (e.g., "this device licensed by Game Provider, who certifies the randomness of the dice").

Steps may also be taken to prevent players from accidentally or intentionally changing the score incorrectly. For example, anytime the score is changed, a sound is played. The sound could vary, depending on which player changes the score. The set top box 110 game application may be able to tell which player is authorized to change the score at any given point in a game, or be programmed that the score should not be changed during certain phases of a game.

To ensure that speed-based games are accurately played, the game system 100 can use separate channels and separate detectors for each controller 200. This feature would prevent the problem of having four nearly-simultaneous bursts of, e.g., IR light, overlap so that the set top box 110 could not distinguish the correct response.

In another exemplary implementation, the game presentation (score, dice, etc.) could be overlaid on top of an existing television program, or as a picture-in-picture display, so the game could be played while a TV program is viewed.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A game system, comprising:
a communications device;
a first game controller separate from and functionally coupled to the communications device, the first game controller having a first touch screen display;
the communications device establishing communication between the communications device and the first game controller for manipulating game content, the communications device being a set top box;
the communications device receiving game content from a network, the content being displayed on the communications device and interactively controlled by the first game controller via communication with the communications device, the communications device registering with a remote host server;
wherein the first game controller is configured to be registered over the network so that upon creation of a user account and profile, a gaming service account is created by the remote host server for the first game controller, wherein upon registration with the remote host server, the first game controller is assigned a name, the first game controller having a unique electronic code to identify the first game controller, the communications device being assigned a unique internet protocol television address by the remote host server and the first game controller being assigned a unique internet protocol television sub-address by the remote host server to identify the communications device and the first game controller;
wherein the remote host server communicates with an authentication server executing authentication software for controlling access to network services provided by the remote host server, the authentication server in communication with a customer identity system database storing device identifiers for communications devices and users credentials, the authentication server controlling access to game content from the network in response to a received device identifier for the communications device and received user credentials;
a second game controller separate from and functionally coupled to the communications device and to the first game controller, the second game controller having a second touch screen display;
wherein the second game controller is configured to be registered over the network so that a second gaming service account is created for the second game controller, the second game controller being assigned a unique internet protocol television sub-address by the remote host server to identify the second game controller;
wherein the second game controller is configured to be renamed, the second game controller having a unique electronic code to identify the second game controller;
wherein the first game controller and the second game controller both comprise instructions to enable game input to be exchanged between the first game controller and the second game controller;
wherein the communications device enables game input to be exchanged between the first game controller and the communications device and enables game input to be exchanged between the second game controller and the communications device;
wherein a parent user with maximum defined access control privileges as set forth in a parent user gaming service account controls access to games by the gaming service account.

* * * * *